(12) United States Patent
Furubayashi et al.

(10) Patent No.: US 10,661,699 B2
(45) Date of Patent: May 26, 2020

(54) LIGHTING TOOL FOR VEHICLE INCLUDING LIGHT SOURCES AND LIGHT GUIDE BODY

(71) Applicant: STANLEY ELECTRIC CO., LTD., Tokyo (JP)

(72) Inventors: Kazuya Furubayashi, Tokyo (JP); Takumi Kusano, Tokyo (JP); Junpei Kido, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/412,016

(22) Filed: May 14, 2019

(65) Prior Publication Data
US 2019/0351814 A1 Nov. 21, 2019

(30) Foreign Application Priority Data

May 17, 2018 (JP) .................................. 2018-095193

(51) Int. Cl.
*F21S 8/10* (2006.01)
*B60Q 1/00* (2006.01)
(Continued)

(52) U.S. Cl.
CPC ............ *B60Q 1/0011* (2013.01); *F21S 41/24* (2018.01); *F21S 43/236* (2018.01); *F21S 43/249* (2018.01); *G02B 6/0018* (2013.01); *G02B 6/0021* (2013.01); *G02B 6/0028* (2013.01); *G02B 6/0031* (2013.01); *G02B 6/0073* (2013.01); *F21V 2200/20* (2015.01)

(58) Field of Classification Search
CPC ...... F21S 43/249; F21S 43/236; G02B 6/002; G02B 6/0028; G02B 6/0018; G02B 6/0036; G02B 6/0046; B60Q 1/0011
See application file for complete search history.

(56) References Cited

U.S. PATENT DOCUMENTS 6,851,819 B2 * 2/2005 Naghi ..................... A63F 13/02
362/85
8,702,281 B2 * 4/2014 Okada ..................... F21S 43/14
362/311.06
(Continued)

FOREIGN PATENT DOCUMENTS

| JP | 2012-004004 A | 1/2012 |
| JP | 2012-119277 A | 6/2012 |
| JP | 2014-075331 A | 4/2014 |

OTHER PUBLICATIONS

The extended European Search Report for the related European Patent Application No. 19174515.7 dated Oct. 28, 2019.

*Primary Examiner* — Karabi Guharay
(74) *Attorney, Agent, or Firm* — Kenealy Vaidya LLP

(57) ABSTRACT

In a lighting tool for a vehicle, a first incident section has a first condensing incident surface disposed at a center of a portion facing a first light source and into which a part of light emitted from the first light source enters, and a protrusion protruding from a position surrounding the first condensing incident surface toward the first light source, a second incident section has a second condensing incident surface disposed at a portion facing a second light source and into which light emitted from the second light source enters, and the second condensing incident surface is provided adjacent to the protrusion.

16 Claims, 7 Drawing Sheets

(51) Int. Cl.
*F21S 41/24* (2018.01)
*F21S 43/249* (2018.01)
*F21S 43/236* (2018.01)
*F21V 8/00* (2006.01)

(56) References Cited

U.S. PATENT DOCUMENTS

| | | | |
|---|---|---|---|
| 9,701,240 B2 * | 7/2017 | Matsumaru | B60Q 1/2619 |
| 9,887,027 B2 * | 2/2018 | Schierle-Arndt | C23F 11/08 |
| 2018/0038569 A1 | 2/2018 | Hanulak et al. | |
| 2018/0356582 A1 * | 12/2018 | Sousek | F21S 41/24 |

* cited by examiner

LIGHTING TOOL FOR VEHICLE INCLUDING LIGHT SOURCES AND LIGHT GUIDE BODY

CROSS-REFERENCE TO RELATED APPLICATION

Priority is claimed on Japanese Patent Application No. 2018-095193, filed May 17, 2018, the content of which is incorporated herein by reference.

BACKGROUND OF THE INVENTION

Field of the Invention

The present invention relates to a lighting tool for a vehicle.

Description of Related Art

In the related art, as a lighting tool for a vehicle mounted on a vehicle, there is a lighting tool obtained by combining a light source such as a light emitting diode (LED) or the like and a light guide body having a rod shape, a plate shape, or the like (for example, see Japanese Unexamined Patent Application, First Publication No. 2014-75331 and Japanese Unexamined Patent Application, First Publication No. 2012-4004). In such a lighting tool for a vehicle, light emitted from the light source enters a light guide body from a base end side, the light is guided toward a tip side of the light guide body, the light reflected by a plurality of reflection cuts provided on a back surface side of the light guide body is emitted from a front face side of the light guide body, and thus, the light is emitted from the front face side of the light guide body.

In addition, in lighting tools for a vehicle in recent years, emission from light guide bodies has been mutually performed for light from light sources having different colored light according to divergence in designs. As a combination of such lighting tools for a vehicle, for example, a combination of width indicators (position lamps) configured to emit white light and direction indicators (turn lamps) configured to emit orange light as lighting tools for a vehicle mounted on both corner sections of a front end side of a vehicle, a combination of taillights (tail lamps) configured to emit red light and direction indicators (turn lamps) configured to emit orange light as lighting tools for a vehicle mounted on both corner sections of a rear end side of the vehicle, or the like may be provided.

SUMMARY OF THE INVENTION

Incidentally, when the above-mentioned light guide bodies are made to emit light due to lights from light sources having different colored lights, it is necessary to dispose the light sources having different colored lights separately, and to mutually guide the lights toward the same direction after the lights from each of the light sources are made to enter the light guide bodies from different positions, respectively. However, in this case, not only is a structure of portions (incident sections) into which light emitted from the light sources enter becomes complicated, but also the size of the light guide body is increased.

An aspect of the present invention is directed to providing a lighting tool for a vehicle capable of efficiently guiding light entering from different positions without causing an increase in size of a light guide body.

In order to accomplish the above-mentioned objects, the present invention provides the following means

[1] A lighting tool for a vehicle including:
a first light source and a second light source that are disposed next to each other; and
a light guide body configured to guide light from the first light source and the second light source in a same direction,
wherein the light guide body has:
a first incident section and a second incident section disposed to face the first light source and the second light source, respectively, and into which light emitted from the first light source and the second light source enters, respectively;
a reflection section that is disposed to face the first incident section and the second incident section and that is configured to reflect light entering from the first incident section and the second incident section in a same direction; and
a light guide section configured to guide the light reflected by the reflection section,
the first incident section has a first condensing incident surface that is disposed at a center of a portion facing the first light source and into which a part of the light emitted from the first light source enters, and a protrusion protruding from a position surrounding the first condensing incident surface toward the first light source,
the second incident section has a second condensing incident surface that is disposed at a portion facing the second light source and into which the light emitted from the second light source enters, and
the second condensing incident surface is provided adjacent to the protrusion.

[2] The lighting tool for a vehicle according to the above-mentioned [1], wherein the first incident section and the second incident section cause the light radially emitted from the first light source and the second light source to enter the light guide body while being parallelized or condensed.

[3] The lighting tool for a vehicle according to the above-mentioned [1] or [2], wherein the reflection section has an inclined surface that is inclined toward the light guide section, and
the inclined surface is provided to be continuous in a direction in which the first light source and the second light source are aligned.

[4] The lighting tool for a vehicle according to any one of the above-mentioned [1] to [3], wherein the light guide body makes a light emitting section provided on a front face side of the light guide section to emit light by emitting the light reflected by a plurality of reflection cuts provided on a back surface side of the light guide section from the front face side of the light guide section to the outside while guiding the light reflected by the reflection section into the light guide section.

[5] The lighting tool for a vehicle according to any one of the above-mentioned [1] to [4], wherein the plurality of first light sources and the plurality of second light sources are provided to be arranged alternately in a direction crossing a direction of advance of the light reflected from the reflection section toward the light guide section.

[6] The lighting tool for a vehicle according to any one of the above-mentioned [1] to [5], wherein the first light source and the second light source emit different colored lights.

As described above, according to the aspect of the present invention, it is possible to provide a lighting tool for a vehicle capable of efficiently guiding light entering from different positions without causing an increase in size of a light guide body.

DETAILED DESCRIPTION OF THE INVENTION

Figure 1:
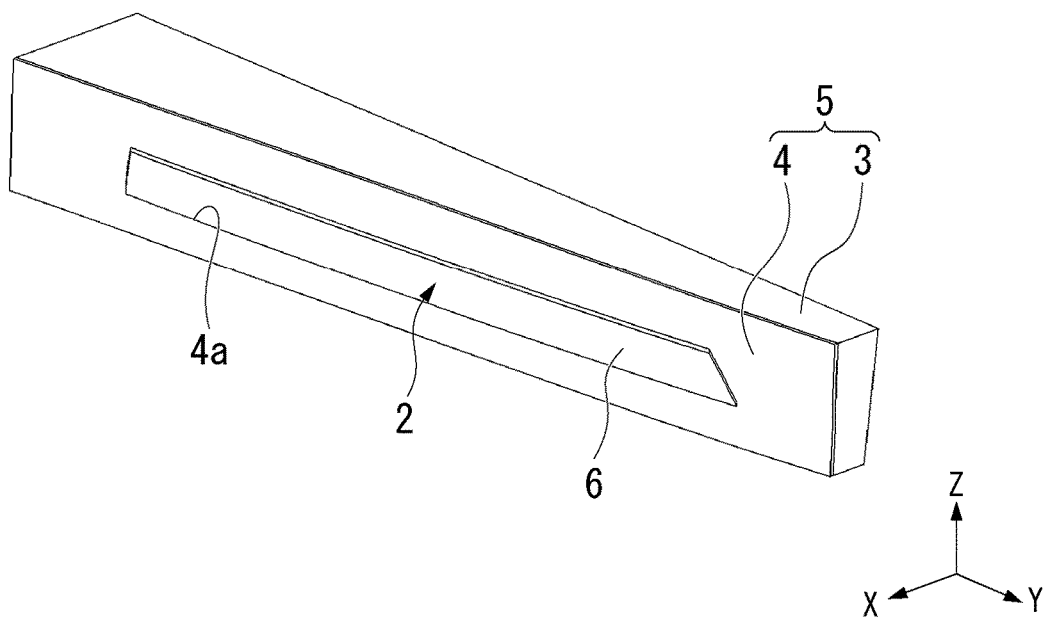
FIG. 1 is a perspective view showing a configuration of a lighting tool for a vehicle according to an embodiment of the present invention.

Hereinafter, an embodiment of the present invention will be described in detail with reference to the accompanying drawings.

Further, in the drawings used in the following description, for the convenience of easy understanding of components, scales of dimensions may be shown differently depending on the components, and dimensional ratios or the like between the components may not necessarily be the same as the actual ones.

For example, a lighting tool 1 for a vehicle shown in FIG. 1 to FIG. 13 will be described as the embodiment of the present invention.

Figure 2:
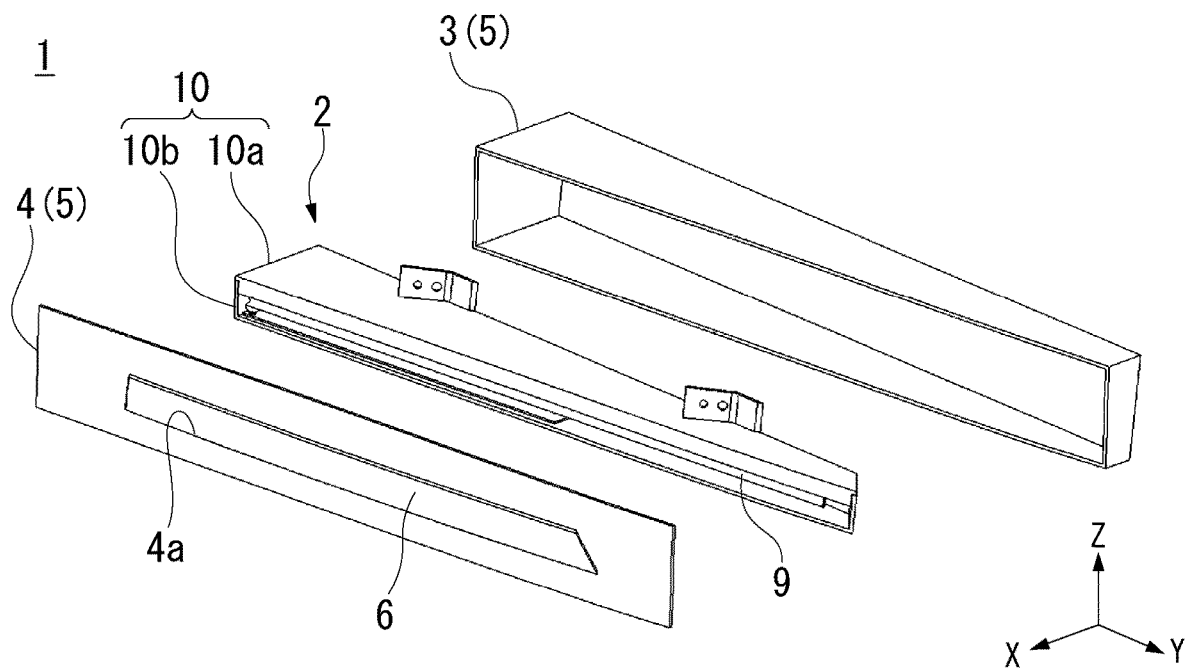
FIG. 2 is an exploded perspective view showing the configuration of the lighting tool for a vehicle shown in FIG. 1.
Figure 3:
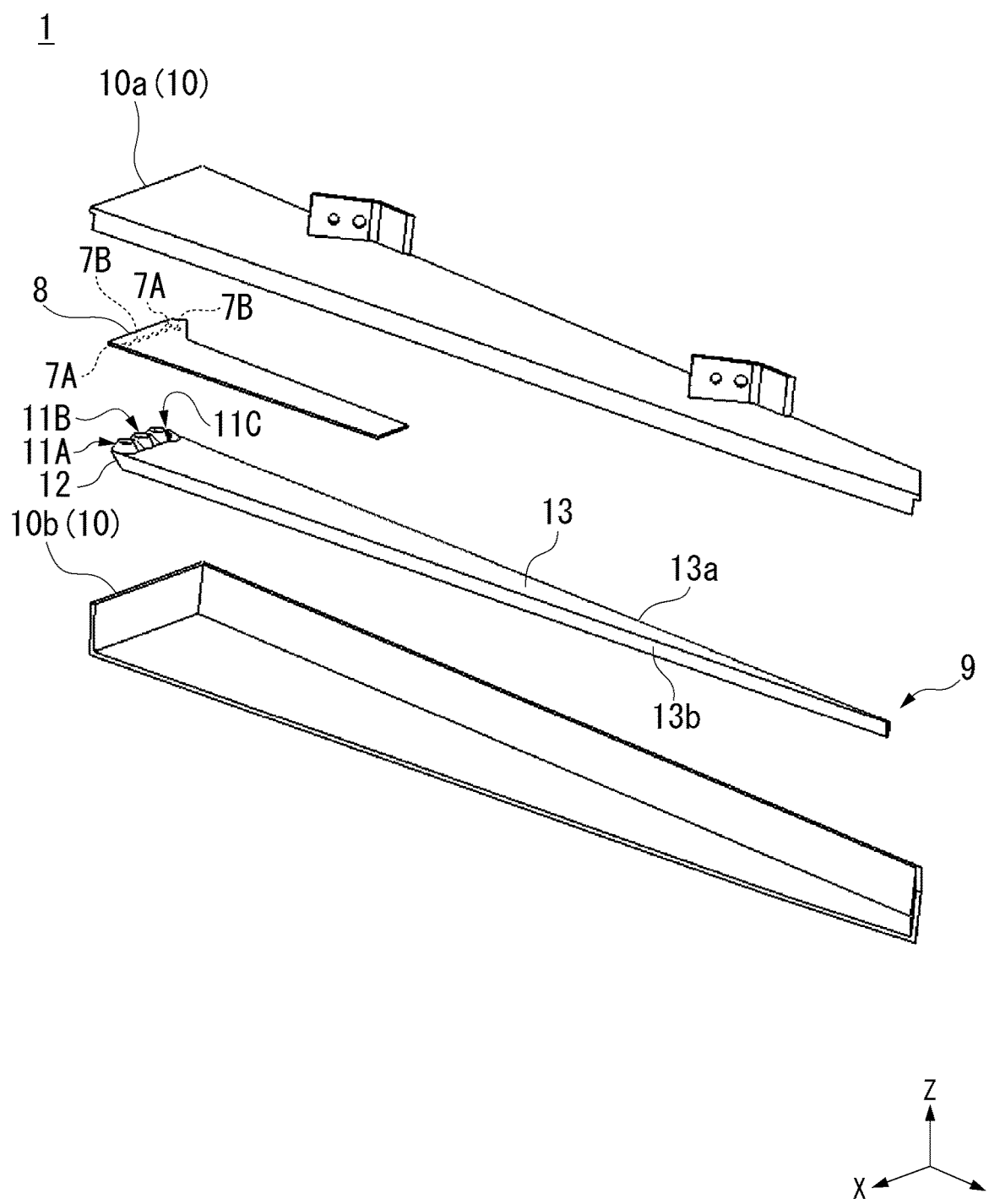
FIG. 3 is an exploded perspective view showing a configuration of a lighting tool unit included in the lighting tool for a vehicle shown in FIG. 2.
Figure 4:
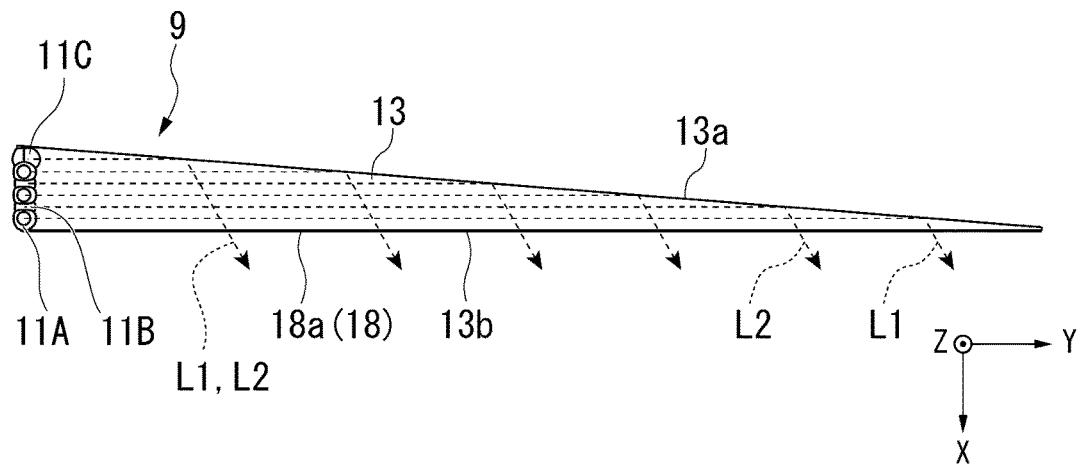
FIG. 4 is a plan view showing a configuration of a light guide body included in the lighting tool unit shown in FIG. 3.
Figure 5:
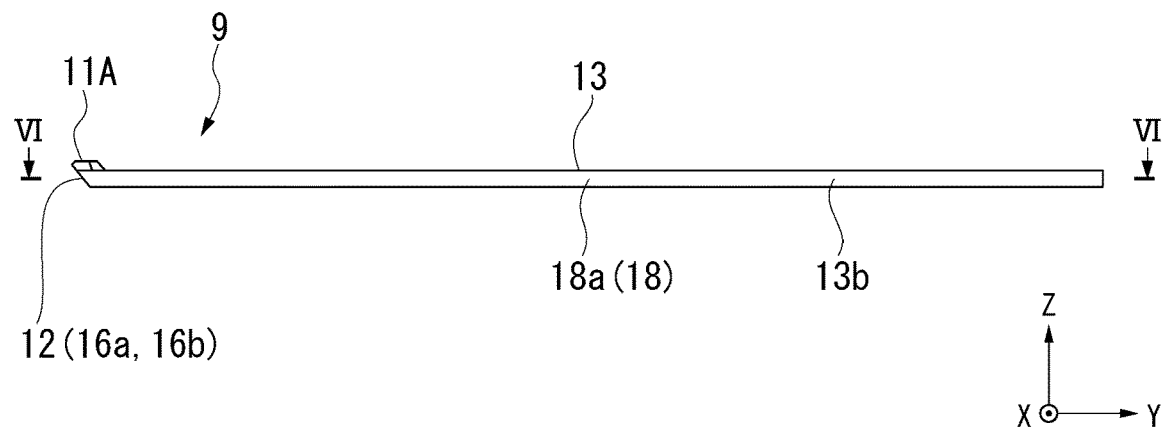
FIG. 5 is a front view showing a configuration of the light guide body included in the lighting tool unit shown in FIG. 3.
Figure 6:
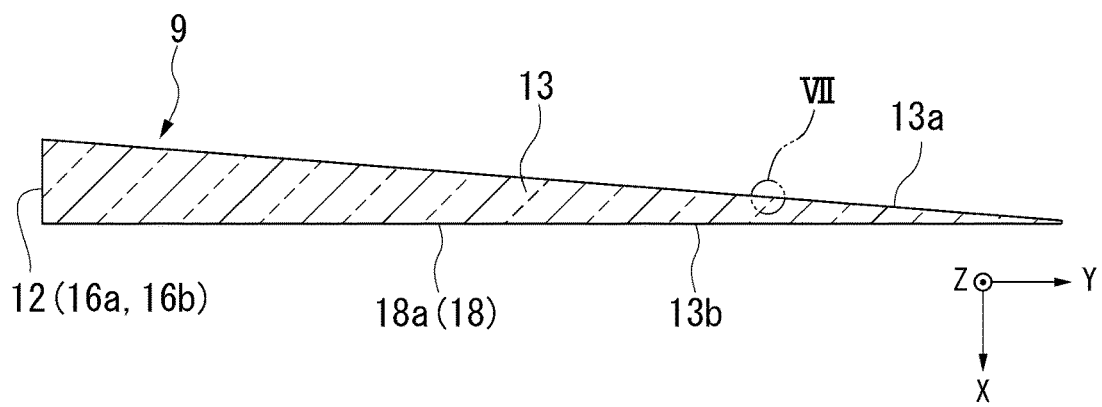
FIG. 6 is a cross-sectional view of the light guide body taken along line segment VI-VI shown in FIG. 5.
Figure 7:
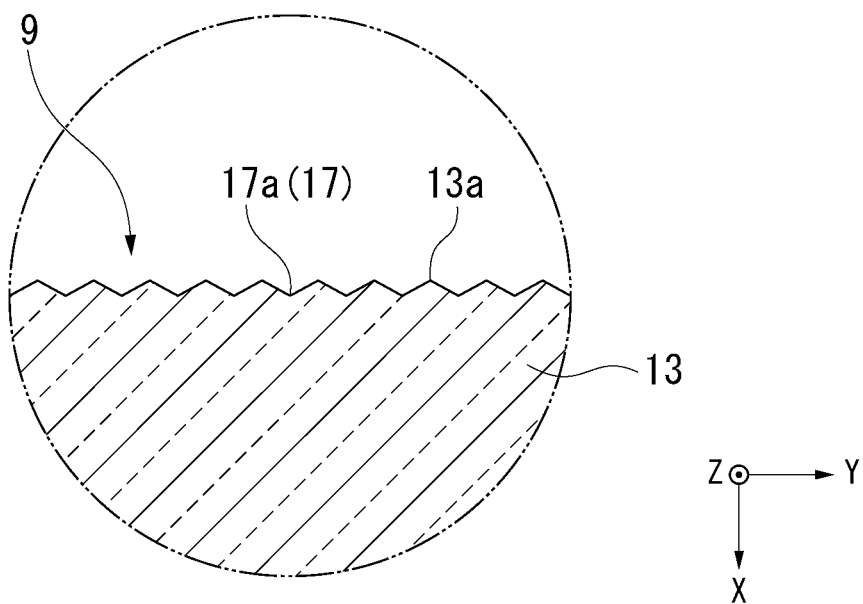
FIG. 7 is an enlarged cross-sectional view of an enclosed portion VII shown in FIG. 6 of the light guide body.
Figure 8:
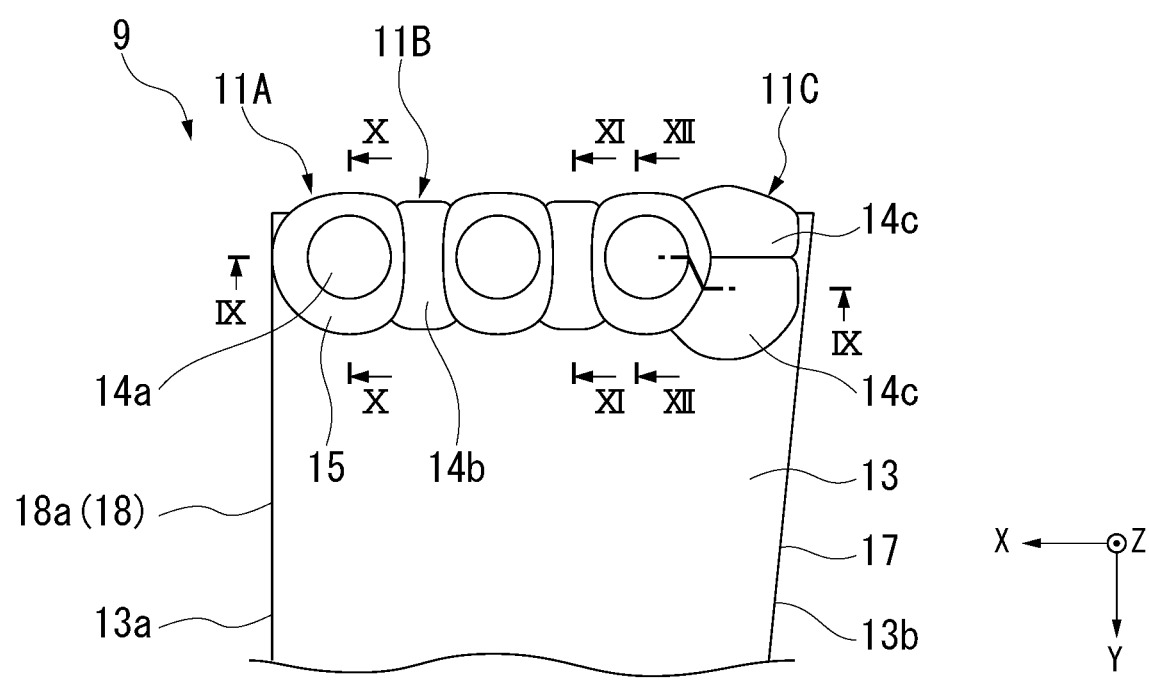
FIG. 8 is an enlarged plan view showing a major part of the light guide body shown in FIG. 4.
Figure 9:
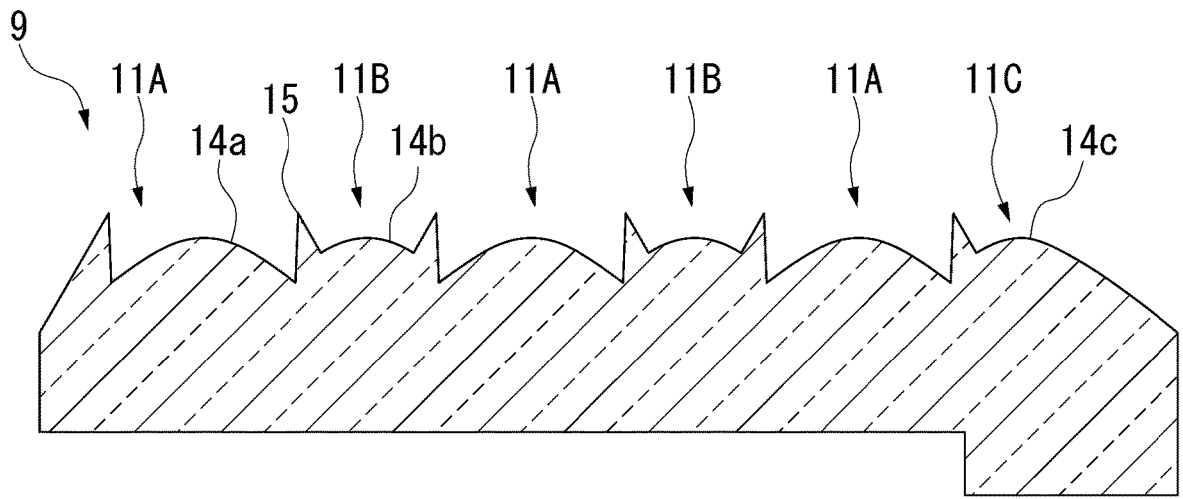
FIG. 9 is a cross-sectional view of the light guide body taken along line segment IX-IX shown in FIG. 8.
Figure 10:
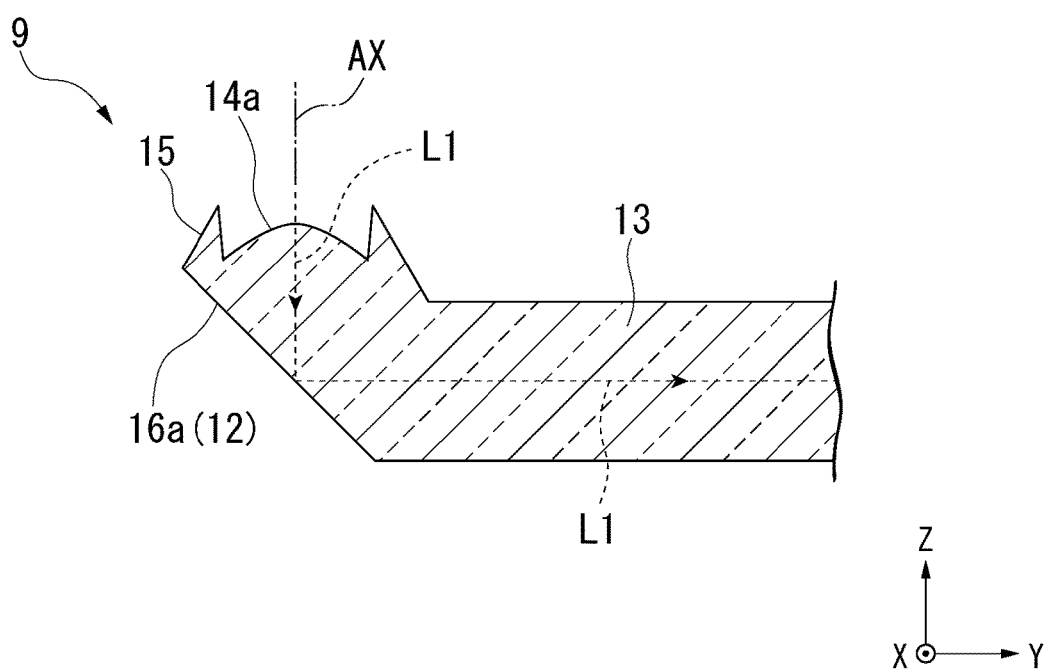
FIG. 10 is a cross-sectional view of the light guide body taken along line segment X-X shown in FIG. 8.
Figure 11:
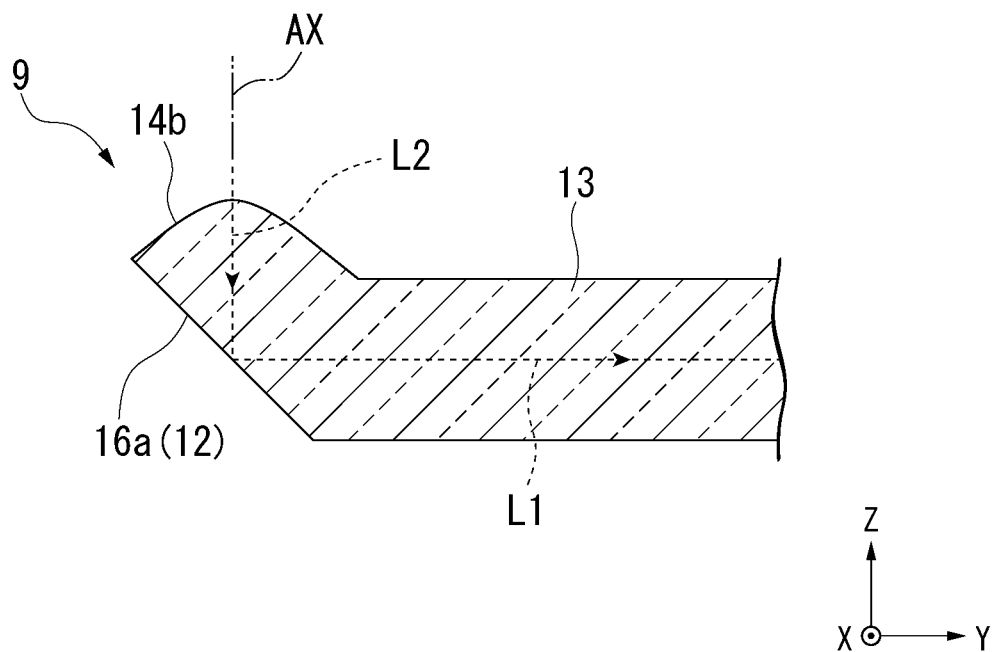
FIG. 11 is a cross-sectional view of the light guide body taken along line segment XI-XI shown in FIG. 8.
Figure 12:
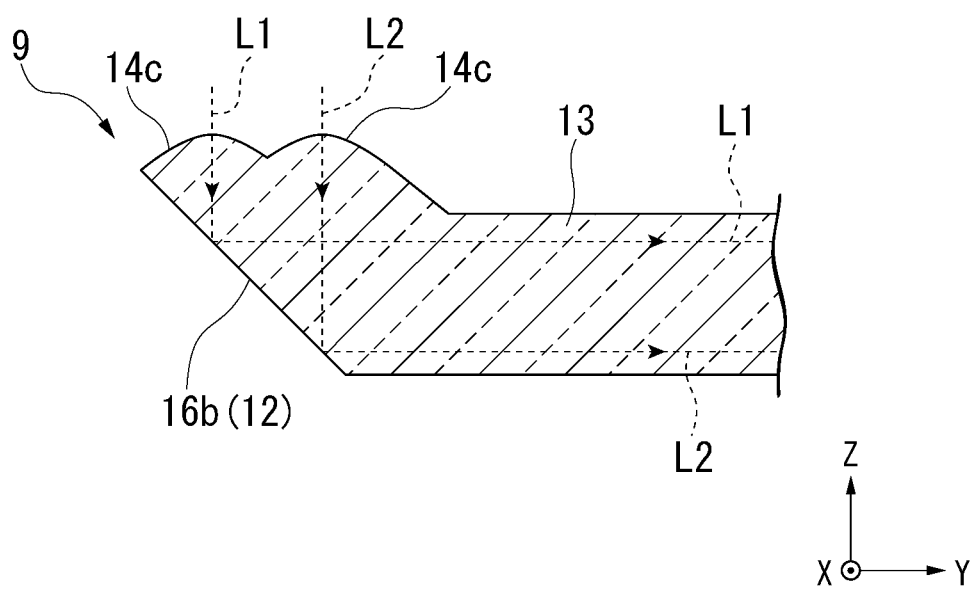
FIG. 12 is a cross-sectional view of the light guide body taken along line segment XII-XII shown in FIG. 8.
Figure 13:
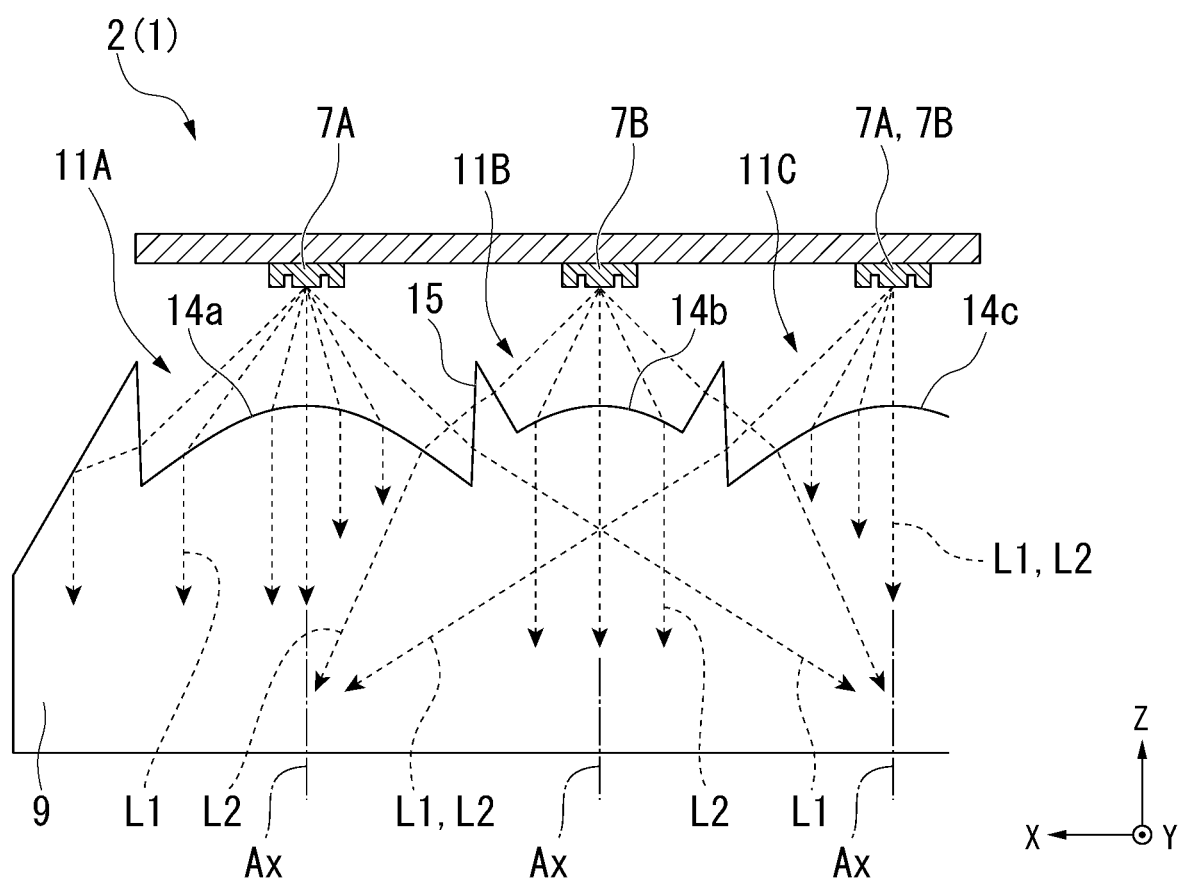
FIG. 13 is a cross-sectional view showing optical paths of lights emitted from a first light source and a second light source when seen in a direction shown in FIG. 8.

Further, FIG. 1 is a perspective view showing a configuration of the lighting tool 1 for a vehicle. FIG. 2 is an exploded perspective view showing a configuration of the lighting tool 1 for a vehicle. FIG. 3 is an exploded perspective view showing a configuration of a lighting tool unit 2 included in the lighting tool 1 for a vehicle. FIG. 4 is a plan view showing a configuration of a light guide body 9 included in the lighting tool unit 2. FIG. 5 is a front view showing a configuration of the light guide body 9 included in the lighting tool unit 2. FIG. 6 is a cross-sectional view of the light guide body 9 taken along line segment VI-VI shown in FIG. 5. FIG. 7 is an enlarged cross-sectional view of an enclosed portion VII shown in FIG. 6 of the light guide body 9. FIG. 8 is an enlarged plan view of a major part of the light guide body 9 shown in FIG. 4. FIG. 9 is a cross-sectional view of the light guide body 9 taken along line segment IX-IX shown in FIG. 8. FIG. 10 is a cross-sectional view of the light guide body 9 taken along line segment X-X shown in FIG. 8. FIG. 11 is a cross-sectional view of the light guide body 9 taken along line segment XI-XI shown in FIG. 8. FIG. 12 is a cross-sectional view of the light guide body 9 taken along line segment XII-XII shown in FIG. 8. FIG. 13 is a cross-sectional view showing optical paths of lights L1 and L2 emitted from a first light source 7A and a second light source 7B when seen in a direction shown in FIG. 8.

In addition, in the following drawings, an XYZ orthogonal coordinate system is set, an X-axis direction indicates a forward/rearward direction (a lengthwise direction) with respect to the lighting tool 1 for a vehicle, a Y-axis direction indicates a leftward/rightward direction (a widthwise direction) with respect to the lighting tool 1 for a vehicle, and a Z-axis direction indicates an upward/downward direction (a height direction) with respect to the lighting tool 1 for a vehicle.

For example, the lighting tool 1 for a vehicle of the embodiment is mounted on each of both corner sections of a front end side (in the embodiment, a corner section on a left front end side) of a vehicle (not shown), and constituted by a position and turn lamp obtained by combining a width indicator (a position lamp) configured to emit white light and a direction indicator (a turn lamp) configured to emit blinking orange light.

Specifically, as shown in FIG. 1 and FIG. 2, the lighting tool 1 for a vehicle of the embodiment includes the lighting tool unit 2 that functions as a position and turn lamp. The lighting tool unit 2 is disposed inside a lighting body 5 constituted by a housing 3 having a front surface (a front face) that is open and a lens cover 4 configured to close a front surface side of the housing 3 and having an opening section 4a corresponding to the lighting tool unit 2. In addition, a transparent outer lens 6 is attached to the opening section 4a of the lens cover 4.

As shown in FIG. 2 and FIG. 3, the lighting tool unit 2 includes a plurality of (in the embodiment, three) first light sources 7A and a plurality of (in the embodiment, four) second light sources 7B, a circuit board 8, the light guide body 9 and a bracket 10.

The plurality of first light sources 7A are constituted by LEDs configured to emit white light (hereinafter, simply referred to as light L1) as light sources for a position lamp. In addition, a high output (high brightness) type (for example, an SMD LED or the like) for vehicle illumination is used as the LED. The plurality of first light sources 7A are mounted on a lower surface side of the circuit board 8, on which a driving circuit configured to drive the LED is provided, side by side with certain intervals therebetween in a forward/rearward direction. Accordingly, the plurality of first light sources 7A emit light L1 radially downward.

The plurality of second light sources 7B are constituted by LEDs configured to emit orange light (hereinafter, simply referred to as light L2) as light sources for a turn lamp. In addition, a high output (high brightness) type (for example, an SMD LED or the like) for vehicle illumination is used as the LED. The plurality of second light sources 7B are mounted on a lower surface side of the circuit board 8, on which a driving circuit configured to drive the LED is provided, side by side at a constant interval in the forward/rearward direction. Accordingly, the plurality of second light sources 7B emit the light L2 radially downward.

The plurality of (in the embodiment, three) first light sources 7A and the plurality of (in the embodiment, two) second light sources 7B are disposed next to each other, and provided to be disposed alternately side by side in a direction crossing a direction of advance of the lights L1 and L2 reflected from a reflection section 12 to a light guide section 13 of the light guide body 9, which will be described below.

Meanwhile, the first light source 7A and the second light source 7B disposed closest to a back surface side of the light guide body 9, which will be described below, are provided to be disposed alternately side by side in the direction of advance of the lights L1 and L2 reflected from the reflection section 12 toward the light guide section 13 of the light guide body 9, which will be described below.

As shown in FIG. 4 to FIG. 12, the light guide body 9 serving as an inner lens is formed in a substantially triangular flat plate shape as a whole, and a main surface thereof is disposed in a direction parallel to a horizontal direction. Further, a material having a higher refractive index than that of air such as a transparent resin that is transparent with respect to the lights L1 and L2 emitted from the light sources 7A and 7B, for example, polycarbonate, acryl, or the like, glass, or the like, may be used in the light guide body 9.

The light guide body 9 has a plurality of (in the embodiment, three) first incident sections 11A, a plurality of (in the embodiment, two) second incident sections 11B, a third incident section 11C, the reflection section 12 and the light guide section 13.

As shown in FIG. 8 to FIG. 10, the plurality of first incident sections 11A are provided side by side at equal intervals in the forward/rearward direction along an end portion of an upper surface of the light guide body 9 on a base end side so as to face the plurality of first light sources 7A except for the first light source 7A disposed closest to a back surface side of the light guide body 9. The first incident section 11A has a first condensing incident surface 14a having a convex surface shape, disposed at a center of a portion corresponding to the first light source 7A and into which a part of the light L1 emitted from the first light source 7A enters, and a protrusion 15 protruding from a position surrounding the first condensing incident surface 14a toward the first light source 7A.

In each of the first incident sections 11A, as shown in FIG. 13, the light L1 that has been emitted from the first light source 7A and that has entered from the first condensing incident surface 14a is condensed toward the vicinity of an optical axis. Accordingly, in the first incident sections 11A, the light L1 radially emitted from the first light source 7A can enter the light guide body 9 while being parallelized or condensed.

In addition, in each of the first incident sections 11A, a part of the light L1 emitted from each of the first light sources 7A enters the light guide body 9 while diffusing the light L1 entering from the protrusion 15. Accordingly, occurrence of brightness unevenness in a light emitting section 18, which will be described below, can be prevented.

As shown in FIG. 8, FIG. 9 and FIG. 11, the plurality of second incident sections 11B are provided to be disposed side by side at equal intervals in the forward/rearward direction along the end portion of the upper surface of the light guide body 9 on the base end side so as to face the plurality of second light sources 7B except for the second light source 7B disposed closest to the back surface side of the light guide body 9.

The second incident section 11B has a second condensing incident surface 14b having a convex surface shape, disposed at a portion facing the second light source 7B and into which the light L2 emitted from the second light source 7B enters.

The second condensing incident surface 14b is provided adjacent to the protrusion 15. In addition, the second condensing incident surface 14b is provided between the protrusions 15 that are adjacent to each other.

As shown in FIG. 13, in each of the second incident sections 11B, the light L2 emitted from the second light source 7B and entering form the second condensing incident surface 14b is condensed toward the vicinity of the optical axis. Accordingly, in each of the second incident sections 11B, the light L2 radially emitted from the second light source 7B can enter the light guide body 9 while being parallelized or condensed.

In addition, in each of the second incident sections 11B, among the light L2 that has been emitted from the second light sources 7B, the light L2 that has entered from the protrusion 15 is made to enter inside of the light guide body 9 while being diffused. Accordingly, occurrence of brightness unevenness in the light emitting section 18, which will be described below, can be prevented.

As shown in FIGS. 8, 9 and 12, the third incident section 11C is provided on the end portion of the upper surface of the light guide body 9 on the base end side so as to face the first light source 7A and the second light source 7B disposed closest to the back surface side of the light guide body 9. The third incident section 11C has a third condensing incident surface 14c having a plurality of (in the embodiment, two) convex surface shapes, disposed at portions facing the first light source 7A and the second light source 7B disposed closest to the back surface side of the light guide body 9 and into which the light L1 emitted from the first light source 7A and the light L2 emitted from the second light source 7B enter.

The third condensing incident surface 14c is adjacent to the protrusion 15 and is provided parallel to the direction of advance of the lights L1 and L2 reflected from the reflection section 12 toward the light guide section 13.

As shown in FIG. 13, in the third incident section 11C, the lights L1 and L2 that has been emitted from the first light source 7A and the second light source 7B disposed closest to the back surface side of the light guide body 9 and that has entered from the third condensing incident surfaces 14c are condensed toward the vicinity of the optical axis. Accordingly, in the third incident section 11C, the lights L1 and L2 radially emitted from the first light source 7A and the second light source 7B disposed closest to the back surface side of the light guide body 9 can enter the light guide body 9 while being parallelized or condensed.

As shown in FIG. 6 and FIG. 10 to FIG. 12, the reflection section 12 has a first inclined surface 16a and a second inclined surface 16b disposed at an end portion of the light guide body 9 on a base end side and inclined toward the light guide section 13.

As shown in FIGS. 10 and 11, the first inclined surface 16a is provided to be inclined toward the light guide section 13 at an angle of 45° with respect to an optical axis AX of the lights L1 and L2 emitted from the first light sources 7A and the second light sources 7B except for the first light source 7A and the second light source 7B disposed closest to the back surface side of the light guide body 9. In addition, the first inclined surface 16a is provided to be continuous in a direction in which the plurality of first light sources 7A and the plurality of second light sources 7B are aligned.

As shown in FIG. 12, the second inclined surface 16b is provided to be inclined toward the light guide section 13 at an angle of 45° with respect to the optical axis AX of the lights L1 and L2 emitted from the first light source 7A and the second light source 7B disposed closest to the back surface side of the light guide body 9.

In the reflection section 12, the lights L1 and L2 that has entered from the first incident sections 11A and the second incident sections 11B are reflected in the same direction toward the light guide section 13 by the first inclined surface 16a and the second inclined surface 16b.

The light guide section 13 has a substantially triangular flat plate shape in which the back surface 13a and the front face 13b are joined to each other at a tip side in which a back surface 13a side is inclined toward a front face 13b as it goes from a base end side to a tip side of the light guide body 9.

In the light guide body 9, the light emitting section 18 provided on a front face side of the light guide section 13 emits light by emitting the lights L1 and L2 reflected by a plurality of reflection cuts 17 provided on the back surface 13a side of the light guide section from the front face 13b side of the light guide section 13 to the outside while the lights L1 and L2 reflected by the reflection section 12 are guided into the light guide section 13.

Shapes, sizes, numbers, or the like, of the plurality of reflection cuts 17 are not particularly limited as long as the lights L1 and L2 entering the back surface 13a of the light guide section 13 are reflected at an angle less than a critical angle with respect to the front face 13b of the light guide section 13. For example, as enlarged and shown in FIG. 7, the reflection cuts 17 of the embodiment are configured by periodically arranging substantially V-shaped groove sections 17a obtained by cutting out the back surface 13a of the light guide section 13 in the upward/downward direction.

As shown in FIG. 4 to FIG. 6, the light emitting section 18 has a light emitting surface 18a at a position corresponding to the plurality of reflection cuts 17 on the side of the front face 13b of the light guide section 13. In the light emitting section 18, light can be uniformly emitted from the light emitting surface 18a by the lights L1 and L2 reflected by the plurality of reflection cuts 17.

As shown in FIG. 2 and FIG. 3, the bracket 10 is constituted by an upper case 10a and a lower case 10b, front surface (front face) sides of which are open. The bracket 10 is configured by matching the upper case 10a and the lower case 10b with each other such that the light guide body 9 is interposed in the upward/downward direction in a state in which the circuit board 8 is attached to the upper case 10a. The lighting tool unit 2 is attached to an inside of the housing 3 via the bracket 10 by a fastening screw.

Further, the inside of the bracket 10 may have a configuration in which a reflector (not shown) facing the back surface 13a of the light guide section 13 is provided. Accordingly, the light emitted from the back surface 13a of the light guide section 13 to the outside can be reflected by the reflector, and can enter the inside from the back surface 13a of the light guide section 13 again.

In the lighting tool 1 for a vehicle of the embodiment having the above-mentioned configuration, even when the light emitting section 18 of the light guide body 9 is made to emit light by the lights L1 and L2 from the first light source 7A and the second light source 7B having different colored lights, reduction in size of the light guide body 9 (in particular, the first incident sections 11A and the second incident sections 11B) can be achieved without complicating configurations (shapes) of the first incident sections 11A and the second incident sections 11B.

In addition, in the lighting tool 1 for a vehicle of the embodiment, the lights L1 and L2 entering from the different positions (the first incident sections 11A and the second incident sections 11B) can be efficiently guided without causing an increase in size of the light guide body 9.

Further, the present invention is not particularly limited to the embodiment and various modifications may be made without departing from the scope of the present invention.

For example, while the configuration constituted by the position and turn lamp obtained by combining the width indicator (the position lamp) configured to emit blinking white light and the direction indicator (the turn lamp) configured to emit blinking orange light has been exemplified as the lighting tool 1 for a vehicle mounted on each of both corner sections of the front end side of the vehicle in the embodiment, the present invention may also be applied to a lighting tool constituted by a tail and turn lamp obtained by combining a taillight (a tail lamp) configured to emit red light and a direction indicator (a turn lamp) configured to flicker orange light as a lighting tool for a vehicle mounted on each of both corner sections of a rear end side of the vehicle.

Further, according to regulations in each country, it is possible to keep the position lamp or the tail lamp lighting and to turn off the position lamp or the tail lamp during flickering (lighting) of the turn lamp.

In addition, while the case in which the first light source 7A and the second light source 7B having different colored lights are used has been exemplified in the embodiment, the present invention can also be applied to a lighting tool for a vehicle using the first light source 7A and the second light source 7B having the same colored light. In this case, light emission can be performed with a large light quantity while achieving a decrease in thickness of the light guide body 9.

In addition, when the first light source 7A and the second light source 7B having the same colored light are used in the lighting tool for a vehicle to which the present invention is applicable, for example, the present invention can be widely applied to a lighting tool for a vehicle such as a headlight (a head lamp) for a vehicle, a width indicator (a position lamp), an auxiliary headlight (a subsidiary head lamp), a front (rear) fog light (fog lamp), a daytime running lamp (DRL), a lid lamp, a taillight (a tail lamp), a brake lamp (a stop lamp), a back lamp, a direction indicator (a winker lamp), or the like.

In addition, for example, in addition to the above-mentioned LED, a light emitting element such as a laser diode (LD) or the like can be used for the first light source 7A and the second light source 7B as long as light is emitted radially. In addition, a color of light emitted from the light emitting element can also be appropriately changed to, for example, white light, red light, orange light, or the like, according to uses thereof.

In addition, while the case in which the light guide body 9 having the above-mentioned substantially triangular plate shape is used has been exemplified in the lighting tool 1 for a vehicle, a shape or the like of the light guide body 9 can be appropriately changed according to designs or the like of actual vehicles.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A lighting tool for a vehicle comprising:
   a first light source having a first optical axis and a second light source having a second optical axis, the first light source and second light source being disposed next to each other and arranged such that the first optical axis and second optical axis are directed to a first direction; and
   a light guide body configured to guide light from the first light source and the second light source in a same direction,
   wherein the light guide body has:
      a first incident section and a second incident section disposed to face the first light source and the second light source, respectively, and configured to make light emitted from the first light source and the second light source enter inside the light guide body so that the light advances in the first direction, respectively;
      a reflection section that is disposed to face the first incident section and the second incident section and that is configured to reflect light entering from the first incident section and the second incident section in a same direction;
      a light guide section configured to guide the light reflected by the reflection section,
      the first incident section has a first condensing incident surface that is disposed at a center of a portion facing the first light source, and includes a convex shape facing toward the first light source and into which a part of the light emitted from the first light source enters, and a protrusion protruding from a position surrounding the first condensing incident surface toward the first light source,
      the second incident section has a second condensing incident surface that is disposed at a portion facing the second light source, and includes a convex shape facing toward the second light source and into which the light emitted from the second light source enters,
      the second condensing incident surface is provided adjacent to the protrusion,
      the first condensing incident surface and protrusion are configured such that the part of the light emitted from the first light source enters the protrusion from a side on which the first condensing incident surface is provided, and is diffused inside of the light guide section, and
      the second condensing incident surface and protrusion are configured such that a part of the light emitted from the second light source enters the protrusion from a side on which the second condensing incident surface is provided, and is diffused inside of the light guide section.

2. The lighting tool for a vehicle according to claim 1, wherein the first incident section and the second incident section cause the light radially emitted from the first light source and the second light source to enter the light guide body while being parallelized or condensed.

3. The lighting tool for a vehicle according to claim 1, wherein the reflection section has an inclined surface that is inclined toward the light guide section, and the inclined surface is provided to be continuous in a direction in which the first light source and the second light source are aligned.

4. The lighting tool for a vehicle according to claim 3, wherein the light guide body makes a light emitting section provided on a front face side of the light guide section to emit light by emitting the light reflected by a plurality of reflection cuts provided on a back surface side of the light guide section from the front face side of the light guide section to the outside while guiding the light reflected by the reflection section into the light guide section.

5. The lighting tool for a vehicle according to claim 4, wherein one of the first light source and the second light source is a light source configured to emit blinking orange light and the other one is a light source configured to emit white light or red light.

6. The lighting tool for a vehicle according to claim 1, wherein the light guide body makes a light emitting section provided on a front face side of the light guide section to emit light by emitting the light reflected by a plurality of reflection cuts provided on a back surface side of the light guide section from the front face side of the light guide section to the outside while guiding the light reflected by the reflection section into the light guide section.

7. The lighting tool for a vehicle according to claim 1, wherein the plurality of first light sources and the plurality of second light sources are provided to be arranged alternately in a direction crossing a direction of advance of the light reflected from the reflection section toward the light guide section.

8. The lighting tool for a vehicle according to claim 7, wherein the first light source and the second light source emit different colored lights.

9. The lighting tool for a vehicle according to claim 8, wherein the light guide section further comprises a third incident section which is arranged at an edge portion of the light guide section in a direction in which the first incident section and the second incident section are aligned on the light guide section,
   the third incident section includes at least two third condensing incident surfaces that are aligned in a direction perpendicular with respect to the direction in which the first incident section and the second incident section are aligned, and
   the first light source and the second light source are arranged at positions that correspond to each of the third condensing incident surfaces, respectively.

10. The lighting tool for a vehicle according to claim 9, wherein one of the first light source and the second light source is a light source configured to emit blinking orange light and the other one is a light source configured to emit white light or red light.

11. The lighting tool for a vehicle according to claim 10, wherein the light source configured to emit blinking orange light functions as a direction indicator when turned on, and
   the light source configured to emit white light or red light functions as one of a position lamp, a tail lamp, a subsidiary head lamp, a fog lamp, a daytime running lamp, a lid lamp, a brake lamp and a back lamp when turned on.

12. The lighting tool for a vehicle according to claim 8, wherein one of the first light source and the second light source is a light source configured to emit blinking orange light and the other one is a light source configured to emit white light or red light.

13. The lighting tool for a vehicle according to claim 12, wherein the light source configured to emit blinking orange light functions as a direction indicator when turned on, and
   the light source configured to emit white light or red light functions as one of a position lamp, a tail lamp, a subsidiary head lamp, a fog lamp, a daytime running lamp, a lid lamp, a brake lamp and a back lamp when turned on.

14. The lighting tool for a vehicle according to claim 1, wherein the light guide body is formed in a substantially triangular flat plate shape, and a main surface thereof is disposed in a direction parallel to a horizontal direction.

15. The lighting tool for a vehicle according to claim 1, wherein one of the first light source and the second light source is a light source configured to emit blinking orange light and the other one is a light source configured to emit white light or red light.

16. The lighting tool for a vehicle according to claim 15, wherein the light source configured to emit blinking orange light functions as a direction indicator when turned on, and the light source configured to emit white light or red light functions as one of a position lamp, a tail lamp, a subsidiary head lamp, a fog lamp, a daytime running lamp, a lid lamp, a brake lamp and a back lamp when turned on.

* * * * *